United States Patent
Cigich et al.

(10) Patent No.: US 11,120,483 B1
(45) Date of Patent: Sep. 14, 2021

(54) AFFILIATE-BASED EXCHANGE AND RESOURCE ROUTING

(71) Applicant: Clickbooth.com, LLC, Sarasota, FL (US)

(72) Inventors: Erin Cigich, Sarasota, FL (US); Dzenis Softic, Bradenton, FL (US)

(73) Assignee: Perform[cb], Sarasota, FL (US)

( * ) Notice: Subject to any disclaimer, the term of this patent is extended or adjusted under 35 U.S.C. 154(b) by 0 days.

(21) Appl. No.: 16/654,922

(22) Filed: Oct. 16, 2019

(51) Int. Cl.
*G06Q 30/02* (2012.01)
(52) U.S. Cl.
CPC ..... *G06Q 30/0277* (2013.01); *G06Q 30/0201* (2013.01); *G06Q 30/0246* (2013.01); *G06Q 30/0269* (2013.01)
(58) Field of Classification Search
CPC ........... G06Q 30/0277; G06Q 30/0201; G06Q 30/0269; G06Q 30/0246
See application file for complete search history.

(56) References Cited

U.S. PATENT DOCUMENTS

| | | | |
|---|---|---|---|
| 7,840,667 B2 * | 11/2010 | Weller | H04L 65/4084 709/224 |
| 7,930,384 B1 * | 4/2011 | Lester | G06Q 30/0273 709/224 |
| 7,962,363 B2 * | 6/2011 | Patel | G06Q 30/0275 705/14.4 |
| 8,069,083 B2 | 11/2011 | Mahdian et al. | |
| 8,392,242 B1 | 3/2013 | Utter et al. | |
| 8,917,860 B2 | 12/2014 | Duva et al. | |
| 8,966,446 B1 | 2/2015 | Amacker et al. | |
| 9,043,228 B1 | 5/2015 | Ross et al. | |
| 9,911,135 B2 | 3/2018 | Gupta | |
| 10,521,827 B2 | 12/2019 | Douglas et al. | |
| 2002/0147645 A1 | 10/2002 | Alao et al. | |
| 2006/0074749 A1 | 4/2006 | Kline et al. | |
| 2006/0106665 A1 | 5/2006 | Kumar et al. | |
| 2007/0050711 A1 | 3/2007 | Walker et al. | |

(Continued)

OTHER PUBLICATIONS

"Route Optimization in IP Networks" Jennifer Rexford https://web.archive.org/web/20190917115514/https://www.cs.princeton.edu/~jrex/papers/opthand04.pdf Sep. 17, 2019 (Year: 2019).*

(Continued)

*Primary Examiner* — Alexandru Cirnu
(74) *Attorney, Agent, or Firm* — Crawford Maunu PLLC

(57) ABSTRACT

In accordance with one or more aspects, service requesters (e.g., advertisers) and/or affiliates (e.g., providing data traffic) may be set up for operation on a performance exchange. In accordance with other aspects, performance and monitoring may be carried out for such advertisers and/or affiliates. In some embodiments, routing criteria is established for affiliates, and may include information for selecting data traffic resources such as advertisements and network links, to be routed by the affiliates for providing data traffic over disparate networks. Requests for distribution of the data traffic resources (e.g., advertisements, links for obtaining the data traffic) are received and a routing option is selected for the requests based on the routing criteria for affiliates and criteria associated with a service requester from which the request is received. The routing option may specify one or more affiliates via which the data traffic resources are to be routed.

20 Claims, 5 Drawing Sheets

(56) References Cited

U.S. PATENT DOCUMENTS

| | | |
|---|---|---|
| 2009/0094073 A1 | 4/2009 | Cheung et al. |
| 2010/0324965 A1 | 12/2010 | Croix et al. |
| 2011/0066497 A1 | 3/2011 | Gopinath et al. |
| 2011/0225037 A1 | 9/2011 | Tunca et al. |
| 2012/0123859 A1* | 5/2012 | Gupta ................ G06Q 30/0277 705/14.49 |
| 2015/0025981 A1 | 1/2015 | Zaretsky et al. |
| 2016/0292746 A1 | 10/2016 | Kang et al. |
| 2016/0300260 A1 | 10/2016 | Cigich et al. |
| 2017/0287014 A1 | 10/2017 | Vu et al. |
| 2020/0118193 A1* | 4/2020 | Narayanswamy ........................... G06Q 30/0631 |

OTHER PUBLICATIONS

Copending U.S. patent prosecution of the common Applicant, U.S. Appl. Nos. 16/654,886; 16/654,944; 16/654,957; and 16/654,971, said applications filed Oct. 16, 2019. (No Attachments).
Copending patent prosecution of the common Applicant/Assignee, U.S. Appl. No. 16/654,886. No Attachment.

* cited by examiner

AFFILIATE-BASED EXCHANGE AND RESOURCE ROUTING

OVERVIEW

In various examples, computer-based implementations involve a system to process data for routing of related data, between a service-requesting server and a disparately-situated group of network servers, to effect monitored performance by the disparately-situated group of network servers of certain services provided on behalf of the service-requesting server.

In a variety of network-based communication systems, advertising information is displayed with a variety of media. For instance, websites may sell advertising space, which is used to convey information to users visiting the websites. The users may interact with advertisements displayed, such as by clicking through to another web page.

While advertising and, in general, routing data for displaying the advertising has been useful, the sheer volume of advertisers and publishers looking to serve advertising needs presents challenges to matching advertising needs with publishers who can serve them. Further, various entities use disparate networks for effecting such advertising, which can result in limited or inefficient dissemination of advertisements, and which also limits the ability for publishers to serve larger groups of advertisers. These and other matters have presented challenges to the distribution and routing of data traffic.

SUMMARY

Aspects of the disclosure are directed to assessing data traffic routing characteristics for data routed via network-type communications, and to routing data in a manner that utilizes the assessed characteristics.

In some embodiments, an apparatus includes a router and an exchange module. The router interfaces with a plurality of affiliates for establishing data traffic resource routing criteria for the respective affiliates. The routing criteria may include information for selecting data traffic resources to be routed and served by the affiliates for providing data traffic over disparate networks. The exchange module is configured and arranged to receive requests, from service requesters, for distribution of the data traffic resources for obtaining the data traffic, and to select a routing option for each of the received requests based on the routing criteria for affiliates on criteria associated with the service requester from which the request is received. The routing option specifies at least one of the affiliates via which the data traffic resources are to be routed.

In accordance with a particular embodiment, an apparatus includes a quality assessment module and an exchange module, each of which includes circuitry. The quality assessment module is configured to monitor performance characteristics of a plurality of affiliates that distribute data traffic resources, such as advertisements, over respective communication networks and to further assess quality characteristics of the data traffic resource distribution by the plurality of affiliates, based on the monitored performance and stored data characterizing each of the affiliates. Metrics indicative of performance of each of the affiliates are generated based on the assessed quality characteristics. The exchange module interfaces with a plurality of service requesters (e.g., advertisers) for receiving requests for distribution of the data traffic resources, and with the affiliates for receiving offers for distributing data traffic resources over disparate networks respectively associated with each of the affiliates. For data traffic requests received from one of the plurality of service requesters, the exchange module routes data traffic resources pertaining to the requests to at least one of the plurality of affiliates based on the metrics and the offers received from the plurality of affiliates.

Another embodiment is directed to a method (e.g., as may also be implemented as instructions stored on a non-transitory computer readable medium), as follows. Performance characteristics are monitored for a plurality of affiliates that distribute data traffic resources, such as advertisements, over respective communication networks. Quality characteristics of the data traffic distribution are assessed for the plurality of affiliates based on the monitored performance and stored data characterizing each of the affiliates. Metrics in indicative of performance of each of the affiliates are generated based on the assessed quality characteristics. Interfaces are made with service requesters for receiving requests for distribution of the data traffic resources, and further with the plurality of affiliates for receiving offers for distributing data traffic resources (and, e.g., obtaining related data traffic) over disparate networks respectively associated with each of the affiliates. For data traffic requests received from one of the plurality of service requesters, data traffic resources pertaining to the requests are routed to one or more of the affiliates based on the metrics and the offers received from the plurality of affiliates.

The above discussion/summary is not intended to describe each embodiment or every implementation of the present disclosure. The figures and detailed description that follow also exemplify various embodiments.

BRIEF DESCRIPTION OF FIGURES

Various example may be more completely understood in consideration of the following detailed description in connection with the accompanying drawings, in which.

Figure 1A:
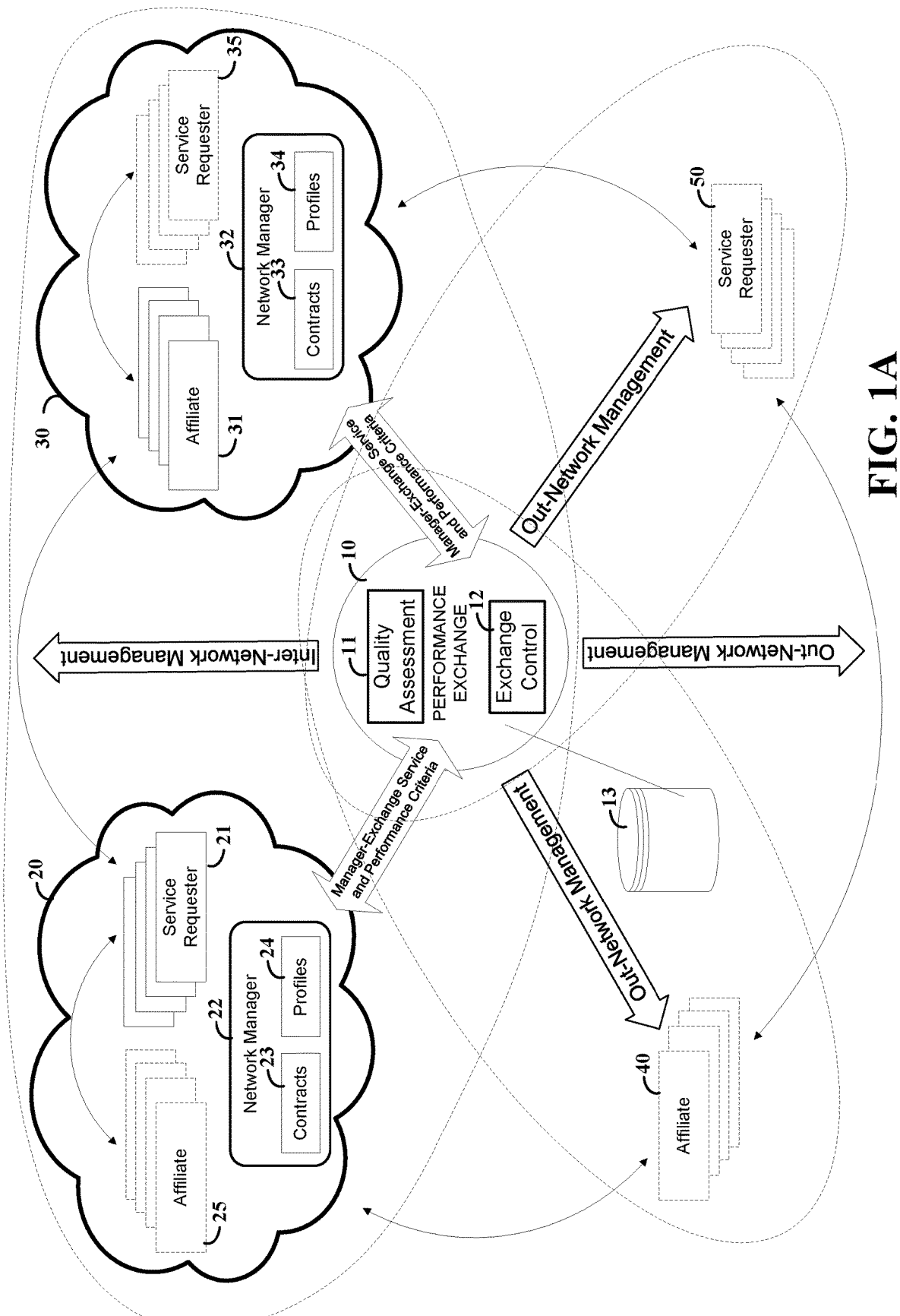
FIG. 1A is a system-level diagram illustrating an example system and related approach for data routing, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are applicable to a variety of different systems and methods involving routing of service-type requests and related performance monitoring and exchange for interactions relating to servicing the requests. As may be implemented in particular embodiments, service requests are routed through an exchange that matches the service requests with affiliates that facilitate performance related to the service requests. This matching may be carried out based on criteria for service requesters and affiliates, and upon metrics corresponding to performance-based monitoring of the affiliates. In some implementations, end users involved with performance may effect or otherwise involve servicing of the requests.

In various embodiments, a plurality of networks interface between service requesters and affiliates, and are accessed by a performance exchange for matching service requesters and affiliates from disparate ones of the networks. Service requests may then be routed between networks, involving disparate entities, which may facilitate servicing overflow requests and further providing an opportunity to serve such overflow requests to affiliates having bandwidth.

As used herein, data traffic refers to engagement by users, which may be in the form of user traffic to engage with a service requestor/data traffic resource that wishes to engage with users. In this sense, traffic may refer to website traffic, engagement of users with a service such as by registering for and/or purchasing a service, downloading information such as an application, or other transactions such as purchases of goods and/or a combination of goods and services. This engagement may be facilitated by affiliates who provide traffic in the form of interaction by such users with, for example, a service requestor's website (e.g., the service requestor is requesting/buying traffic to its website, which affiliates serve by presenting web links and/or advertising type material via which users may engage with the service requestor's website).

Certain aspects of the present disclosure applicable to routing advertising information for display, and related performance monitoring for interactions with the advertising. As may be implemented in particular embodiments, data traffic resources including advertising material are routed through an exchange that matches the service requesters (on behalf of which the resources are provided) with affiliates (publishers) that effect communication of the advertising to end users. Consistent with the above, this matching may be carried out based on criteria for service requesters (e.g., advertisers) and affiliates, and upon metrics corresponding to performance-based monitoring of the affiliates. End users who interact with the data traffic resources may generate data traffic as click-through from links to a web page that may display a product or products for advertising or purchase, providing traffic for that web page.

Approaches such as those characterized herein may thus facilitate interaction between service requesters and a multitude of end users (e.g., hundreds of thousands), who interact with the service requests. Such approaches may involve, for example, service requesters seeking network traffic as may be effected by displaying advertisements and connecting end users who click on the advertisements with the service requesters. Such approaches may also involve serving other types of requests involving networks of entities and users, such as for providing auto insurance offers, battery charging services, or automobile transportation/rental services. In each aspect, a performance exchange is implemented to assess performance and assign metrics for the quality of the manner in which requests are serviced, which may be used to link service requesters and affiliates.

In the following description, various specific details are set forth to describe specific examples, with the understanding that other examples may be practiced without all the specific details given below and that features from figures/embodiment can be combined with features of another figure or embodiment even though the combination is not explicitly shown or explicitly described as a combination. For ease of illustration, the same reference numerals may be used in different diagrams to refer to the same elements or additional instances of the same element.

In some embodiments, data traffic routing is setup for advertisers as follows. A router interfaces with a plurality of affiliates for establishing data traffic resource routing criteria, which may include offers for providing data traffic, for the respective affiliates. The routing criteria may include information for selecting data traffic resources such as advertisements and network links, to be routed and served by the affiliates for providing data traffic over disparate networks. An exchange module is configured to receive requests, from service requesters, for distribution of the data traffic resources for obtaining the data traffic, and to select a routing option for each of the received requests based on the routing criteria for affiliates on criteria associated with the service requester from which the request is received. The routing option specifies at least one of the affiliates via which the data traffic resources are to be routed.

The exchange module may be implemented in a variety of manners, as described here and/or as characterized in the figures. In some implementations, the exchange module includes a filter circuit configured to filter requests based on the information in the requests and the data traffic routing criteria for the plurality of affiliates, and to output information identifying at least one affiliate for serving each request based on the filtering. The exchange module selects one or more of the affiliates specified in the routing option from the identified at least one affiliate. The exchange module may select a routing option based on metrics characterizing performance of the affiliates and offers received from the affiliates, the offers specifying criteria by which the routing option will be performed. The exchange module may be configured to route the received requests based on the selected routing option.

In certain implementations, a quality assessment module is utilized to monitor performance characteristics of the affiliates and routing options associated with the affiliates. Quality characteristics of data traffic resource distribution by the affiliates is assessed based on the monitored performance and stored data characterizing each of the affiliates. Metrics indicative of performance of each of the affiliates are generated based on the assessed quality characteristics, with the criteria associated with the affiliates including the metrics.

Setup is carried out for advertisers as follows, in accordance with one or more embodiments. An apparatus includes a router and an exchange module. The router interfaces with service requesters such as advertisers for establishing data traffic routing criteria for routing data traffic resources on behalf of the respective service requesters. The routing criteria may include information for selecting and implementing routing options for the service requesters. The exchange module selects, for data traffic resource distribution requests from service requesters (for obtaining data traffic), a routing option based on routing criteria for the service requester from which the request is received and criteria associated with disparate affiliates that distribute data traffic resources over disparate networks. The routing option specifies one or more of the affiliates via which the data traffic resources are to be routed. Received requests may be routed based on the selected routing option.

The exchange module may be implemented in a variety of manners. In some implementations, the exchange module includes a filter circuit configured to filter routing options offered by respective affiliates, for each of the received requests, based on the routing criteria and metrics characterizing performance of the routing option. This filtering identifies candidate routing options, one or more of which are selected. In certain implementations, the exchange module selects a routing option based on metrics characterizing performance of the routing option and an affiliate servicing the routing option, and based on an offer received from the affiliate for routing the data traffic via the routing option.

A quality assessment module may be implemented to monitor performance characteristics of the affiliates and routing options associated with the affiliates, and assess quality characteristics of data traffic resource distribution by the affiliates based on the monitored performance and stored data characterizing each of the affiliates. Metrics indicative of performance of each of the affiliates are generated based on the assessed quality characteristics, wherein the criteria associated with the disparate affiliates includes the metrics.

Certain embodiments are directed to an apparatus and method for establishing and effecting routing-type interactions from a service requester/advertiser perspective. In an embodiment, an apparatus includes a router and an exchange module. The router interfaces with a plurality of service requesters for establishing data traffic routing criteria for routing data traffic resources on behalf of the respective service requesters. Such routing criteria may include information for selecting and implementing routing options for the service requesters. The exchange module (which includes circuitry), receive requests from the service requesters for distributing the data traffic resources for obtaining data traffic, and selects a routing option for each of the received requests based on the routing criteria for the service requester from which the request is received and based on criteria associated with disparate affiliates that distribute data traffic resources over disparate networks. The routing option may specify at least one of the affiliates via which the data traffic resources are to be routed.

The exchange module may be implemented in a variety of manners for such service requester/advertiser perspective embodiments. In some implementations, the exchange module includes a filter circuit that filters, for each of the received requests, routing options offered by respective affiliates based on the routing criteria and metrics characterizing performance of the routing option, therein identifying candidate routing options. The exchange module selects the routing option by selecting one of the candidate routing options. In other implementations, the exchange module selects the routing option based on metrics characterizing performance of the routing option and an affiliate servicing the routing option, and based on an offer received from the affiliate for routing the data traffic via the routing option. The exchange module may, for example, route received requests based on the selected routing option.

In a further embodiment involving a service requester/advertiser perspective, a quality assessment module (including circuitry) is configured to monitor performance characteristics of the affiliates and routing options associated with the affiliates and assess quality characteristics of data traffic resource distribution by the affiliates based on the monitored performance and stored data characterizing each of the affiliates. The quality assessment module further generates metrics indicative of performance of each of the affiliates based on the assessed quality characteristics. The criteria associated with the disparate affiliates includes the metrics.

Various embodiments are directed to methods involving a service requester/advertiser perspective. In an embodiment, a plurality of service requesters are interfaced with for establishing data traffic routing criteria for routing data traffic resources on behalf of the respective service requesters. Such routing criteria may include information for selecting and implementing routing options for the service requesters. Requests are received from the service requesters, for distribution of the data traffic resources for obtaining data traffic, and a routing option is selected for each of the received requests based on the routing criteria for the service requester from which the request is received and on criteria associated with disparate affiliates that distribute data traffic resources over disparate networks. Such a routing option may specify at least one of the affiliates via which the data traffic resources are to be routed. The received request may be routed based on the selected routing option.

The routing options may be filtered based on the routing criteria and metrics characterizing performance of the routing option. In this context, candidate routing options may be identified and one of those candidates may be selected.

In certain implementations, the routing options are selected using metrics characterizing performance of the routing option and an affiliate servicing the routing option, and an offer received from the affiliate for routing the data traffic via the routing option.

Quality may further be assessed by monitoring performance characteristics of the affiliates and routing options associated with the affiliates, and assessing quality characteristics of data traffic resource distribution by the affiliates based on the monitored performance and stored data characterizing each of the affiliates. Metrics indicative of performance of each of the affiliates are generated based on the assessed quality characteristics, wherein the criteria associated with the disparate affiliates includes the metrics.

Certain embodiments are directed to methods and/or apparatuses that facilitate routing via monitoring and performance-side operations. In an embodiment, an apparatus includes a quality assessment module, a router and an exchange module. The quality assessment module monitors performance characteristics of data traffic resource distribution by affiliates over respective communication networks, including data traffic responses to the data traffic resource distribution. Quality characteristics of the data traffic resource distribution and related data traffic responses are assessed based on the monitored performance and stored data characterizing each of the affiliates. Metrics indicative of performance of each of the affiliates are generated based on the assessed quality characteristics. The router interfaces with affiliates for establishing data traffic resource routing criteria for the respective affiliates. Such routing criteria may include information for selecting data traffic resources to be routed and served by the affiliates for providing data traffic over disparate networks. The exchange module operates with the router to route data traffic resources provided on behalf of respective service requesters to one or more affiliates based on data corresponding to the service requesters, the routing criteria, and metrics for the plurality of affiliates.

The quality assessment module may be implemented in a variety of manners. In some implementations, the quality assessment module monitors characteristics of resource distribution by one or more affiliates carried out in accordance with different routing offer conditions, and generates metrics for each offer condition based on performance of the affiliate in accordance with the offer condition. In certain implementations, the quality assessment module monitors the engagement of users with network-based content to which the users are directed via the affiliates' routing of the data traffic resources, and generates metrics based on the monitored engagement. In further implementations, the quality assessment module assesses a likelihood of the respective affiliates to be able to route the data traffic resources, in response to which the exchange module then selects ones of the affiliates for routing the data traffic resources based on the assessed likelihood.

In a more particular implementation, the exchange module includes a filter circuit that filters requests for routing data traffic resources based on the information in the requests and the routing criteria for the plurality of affiliates. The filter circuit further outputs information identifying at least one of the affiliates for serving each request based on the filtering. The exchange module then routes the data traffic resources to the identified at least one of the affiliates.

Certain method-based embodiments involving monitoring and performance-side operations are carried out as follows. Quality is assessed by monitoring performance characteristics of data traffic resource distribution by affiliates over respective communication networks, including characteristics of data traffic responses to the data traffic resource distribution. Quality characteristics of the data traffic resource distribution and related data traffic responses are assessed based on the monitored performance and stored data characterizing each of the affiliates, and metrics indicative of performance of each of the affiliates are generated based on the assessed quality characteristics. Data traffic resource routing criteria are established for the respective affiliates. Such routing criteria may include information for selecting data traffic resources to be routed and served by the affiliates for providing data traffic over disparate networks. Data traffic resources provided on behalf of respective service requesters are routed to one or more of the affiliates based on data corresponding to the service requesters, the routing criteria, and metrics for the plurality of affiliates. The engagement of users with network-based content to which the users are directed (via the affiliates' routing of the data traffic resources) is monitored in certain implementations. The metrics can then be generated based on the monitored engagement. In certain implementations, a likelihood of respective affiliates to be able to route certain data traffic resources can be assessed and that assessment can be used in selecting ones of the affiliates for routing the data traffic resources. For instance, historical data indicative of volume performance can be used with current routing volume to assess capabilities.

Further aspects involve monitoring characteristics of data traffic resource distribution by affiliates carried out in accordance with different routing offer conditions. The metrics are generated for each offer condition based on performance of the affiliate in accordance with the offer condition. This approach may provide, for example, metrics specific to certain offer conditions.

In some implementations, the requests are filtered based on the information in the requests and the routing criteria for the affiliates. Information identifying one or more of the affiliates for serving each request is generated/provided based on the filtering. Routing the data traffic resources in this context may include routing the resources to the identified at least one of the affiliates.

Certain embodiments are directed to methods and/or apparatuses that facilitate routing via monitoring and service requester/advertiser-side operations. Such an apparatus may be implemented as follows. A quality assessment module monitors performance characteristics of data traffic resource distribution by affiliates over respective communication networks. The characteristics may relate to data traffic responses to the data traffic resource distribution. Quality characteristics of the data traffic resource distribution and related data traffic responses can be assessed based on the monitored performance and stored data characterizing each of the affiliates, and metrics indicative of performance of each of the affiliates may be generated based on the assessed quality characteristics. A router interfaces with service requesters for establishing data traffic routing criteria for the respective service requesters. Such routing criteria may include information for selecting data traffic resources to be routed and served by the affiliates for providing data traffic over disparate networks. An exchange module operates with the router to serve data traffic resource routing requests from the service requesters. For instance, data traffic resources provided on behalf of the respective service requesters can be routed to one or more affiliates based on data corresponding to the service requesters, the routing criteria, and the metrics for the plurality of affiliates.

The quality assessment module may be implemented in a variety of manners. In some embodiments, the quality assessment module monitors characteristics of data traffic resource distribution by affiliates carried out in accordance with different routing offer conditions. Metrics are generated for each offer condition based on performance of the affiliate in accordance with the offer condition. The quality assessment module may monitor engagement of users with network-based content to which the users are directed via the affiliates' routing of the data traffic resources, and generate metrics based on the monitored engagement. The quality assessment module may assess a likelihood of the respective affiliates to be able to route the data traffic resources, with the exchange module being responsive to select ones of the affiliates for routing the data traffic resources based on the assessed likelihood.

The exchange module may be implemented in a variety of manners. In a particular implementation, exchange module includes a filter circuit that filters requests based on the information in the requests and the routing criteria for the plurality of affiliates. The filter circuit outputs information identifying one or more affiliates for serving each request based on the filtering. The exchange module is responsive by routing the data traffic resources to the identified at least one of the affiliates. In another implementation, such a filter circuit filters offers from affiliates for routing data traffic resources and providing data traffic, based on the metrics, to identify offers for serving the requests. The exchange module is responsive by routing the data traffic resources in accordance with the identified offers.

Certain method embodiments facilitate routing via monitoring and service requester/advertiser-side operations involve assessing quality by monitoring performance characteristics of data traffic resource distribution by a plurality of affiliates over respective communication networks. Such characteristics may relate to data traffic responses to the data traffic resource distribution. Quality characteristics of the data traffic resource distribution and related data traffic responses are assessed based on the monitored performance and stored data characterizing each of the affiliates, and metrics indicative of performance of each of the affiliates are generated based on the assessed quality characteristics. Data traffic routing criteria are established for respective service requesters, in which such routing criteria may include information for selecting data traffic resources to be routed and served by the affiliates for providing data traffic over disparate networks. Data traffic resource routing requests from the service requesters are served by routing data traffic resources provided on behalf of the respective service requesters to the affiliates based on data corresponding to the service requesters, the routing criteria, and the metrics for the plurality of affiliates.

The monitoring may be carried out in a variety of manners. In some implementations, characteristics of data traffic resource distribution by the affiliates is monitored, as carried out in accordance with a plurality of different routing offer conditions. Metrics for each offer condition are generated based on performance of the affiliate in accordance with the offer condition. User engagement with network-based content to which the users are directed via the affiliates' routing of the data traffic resources can also be monitored, with metrics generated based on the monitored engagement.

In some implementations, a likelihood of respective affiliates to be able to route the data traffic resources can also be assessed. Data traffic resources are routed by selecting one or more affiliates based on the assessed likelihood.

Filtering may be effected for requester/advertiser-side operations in a variety of manners. In some implementations, requests are filtered based on the information in the requests and the routing criteria for the plurality of affiliates, and information identifying one or more affiliates for serving each request is output based on the filtering. Routing in this regard may involve routing resources to the identified at least one of the affiliates. In another implementation, affiliate offers for routing data traffic resources and providing data traffic are filtered based on metrics for identifying offers for serving the requests, with the identified offers being utilized for routing the data traffic resources.

Monitoring and performance/serving for affiliates may be implemented in accordance with one or more embodiments. In a particular embodiment, an apparatus includes a quality assessment module, a router and an exchange module. The quality assessment module monitors performance characteristics of data traffic resource distribution by a plurality of affiliates over respective communication networks, including characteristics of data traffic responses such as clicks to the data traffic resource distribution. Quality characteristics of the data traffic resource distribution and related data traffic responses are assessed based on the monitored performance and stored data characterizing each of the affiliates. Metrics indicative of performance of each of the affiliates are generated based on the assessed quality characteristics. The router interfaces with affiliates for establishing data traffic resource routing criteria, such as offers for providing data traffic for the respective affiliates. The routing criteria includes information for selecting data traffic resources such as advertisements and network links to be routed and served by the affiliates for providing data traffic over disparate networks. The exchange module is configured with the router to route data traffic resources provided by (or on behalf of) respective service requesters to at least one of the affiliates based on data corresponding to the service requesters, the routing criteria, and metrics for the plurality of affiliates.

Quality assessment, in this regard, may be offer-specific such that different quality is assessed for different offer standards from a common affiliate. For instance, the quality assessment module may monitor characteristics of data traffic resource distribution by one of the affiliates carried out in accordance with a plurality of different routing offer conditions. Metrics may be generated for each offer condition based on performance of the affiliate in accordance with the offer condition.

The exchange module may be implemented for affiliate-based monitoring and performance in a variety of manners. In some implementations, the exchange module filters requests for routing data traffic resources based on the information in the requests and the routing criteria for the plurality of affiliates, and outputs information identifying at least one of the affiliates for serving each request based on the filtering. The data traffic resources are routed to the identified affiliate(s).

The quality assessment module may be implemented for affiliate-side monitoring and performance, in a variety of manners. In some implementations, the quality assessment module monitors the engagement of users with network-based content to which the users are directed via the affiliates' routing of the data traffic resources, and generates the metrics based on the monitored engagement. The quality assessment module may assess a likelihood of the respective affiliates to be able to route the data traffic resources, with the exchange module being responsive by selecting ones of the affiliates for routing the data traffic resources based on the assessed likelihood.

Advertiser-side monitoring and performance may be carried out in a variety of manners. In some embodiments, an apparatus includes a quality assessment module, a router and an exchange module. The quality assessment module monitors performance characteristics of data traffic resource distribution over respective communication networks, including characteristics of data traffic responses to the data traffic resource distribution. Quality characteristics of the data traffic resource distribution and related data traffic responses are assessed based on the monitored performance and stored data characterizing each of the affiliates. Metrics indicative of performance of each of the affiliates are generated based on the assessed quality characteristics. The router interfaces with service requesters for establishing data traffic routing criteria therefor. Such routing criteria may include information for selecting data traffic resources to be routed and served by the affiliates for providing data traffic over disparate networks. The exchange module may operate with the router to serve data traffic resource routing requests by routing data traffic resources provided by (or on behalf of) respective data traffic resources to one or more affiliates based on data corresponding to the service requesters, the routing criteria, and the metrics for the plurality of affiliates.

Quality assessment from the advertiser side may also be offer-specific, such that different quality may be assessed for different offer standards from a common affiliate. Accordingly, the quality assessment module may monitor characteristics of data traffic resource distribution by one of the affiliates carried out in accordance with a plurality of different routing offer conditions, and generate the metrics for each offer condition based on performance of the affiliate in accordance with the offer condition. The quality assessment module may monitor the engagement of users with network-based content to which the users are directed via the affiliates' routing of the data traffic resources, and may generate the metrics based on the monitored engagement. Further, the quality assessment module may assess a likelihood of the respective affiliates to be able to route the data traffic resources, with the exchange module selecting ones of the affiliates for routing the data traffic resources based on the assessed likelihood.

In certain implementations, the exchange module includes a filter circuit that filters requests based on the information in the requests and the routing criteria for the affiliates. The filter outputs information identifying at least one of the affiliates for serving each request based on the filtering, and the exchange module routes the data traffic resources to the identified affiliate(s). In specific implementations, such a filter circuit filters offers from affiliates for routing data traffic resources and providing data traffic, based on the metrics and therein identifying offers for serving the requests. The exchange module routes the data traffic resources in accordance with the identified offers.

In accordance with one or more embodiments, data routing is effected in a manner to facilitate interactions between advertisers and publishers, the latter of which may be referred to as affiliates and which may perform advertising. Third party online marketing entities may help facilitate such aspects, by providing an interface and related interaction between advertisers and publishers, the former providing data traffic resources involving advertising material, and the later publishing the data traffic resources for generating data traffic (via user interaction) to the advertisers. In these contexts, advertiser s may include an automobile company, a shoe company, a beverage company, or a marketing company contracted to advertise on behalf of other companies. Affiliates may include a news website, a sports website, a blog, a website of an online store, a media buyer who purchases ad space on a website, network, an advertising exchange to drive traffic to an offer landing page, or a publishing company contracted to manage websites on behalf of other companies. Advertisements may also be placed in email newsletters or other types of email, controlled by an affiliate, which may be effected via email marketing companies. An online ad may include, along with the advertisement itself, a link to a website of the advertiser that, when the ad is clicked on by a customer, directs the customer's web browser to the website of the advertiser. A third party online marketing entity as noted above may help place advertisements into a publisher's website, and may help monitor and improve the performance of those advertisements. For instance, preferences for types of advertisements or for settings in which the advertisements are made may be identified for customers or potential customers of a particular publisher.

Certain embodiments are directed to routing data in a performance marketing network operated by the third party online marketing company. Advertisers who wish to disseminate their ads to consumers are matched with publishers (affiliates) who have access to certain traffic through a variety of traffic sources (e.g., email, display advertising, search results, mobile and/or PC applications, and social media). In this context, traffic may refer to or include an amount of views or time spent on a publisher's website (affiliate website) based on aggregate customer actions. This matching may be done on a one to one basis, which may involve human intervention and input. Advertisers may create ad campaigns that specify what online ads they wish to run (e.g., content of the ad, and type of online ad, such as pop up ad, banner ad, or scrolling ad), and may also specify when they want the ads run, how frequently, and in some cases on what websites. Advertisers may pay an affiliate to run their ad. Prices may be a one-size-fits-all flat rate based on completed actions by customers (e.g., sales, leads, and signups). Advertisers may cap their campaigns at a designated budget such as a daily budget, after which their online ad is no longer available for distribution by the publisher.

As advertisers reach their daily budget limits, publishers may seek alternate offers (e.g., alternative online ads) to fill available advertising opportunities which may be suitable. For example, other offers from within a system may be suitable replacements for an offer that a particular affiliate is promoting when this a budget limit is reached. Accordingly, alternate links may be utilized in place of those for which a budget limit has been reached.

Alternate offers may be utilized under a variety of conditions. For example, metadata associated with a customer, such as geo location, or device type, along with competition between advertisers for displaying links on affiliate online content (e.g., bids from other advertisers), can be used to select and implement appropriate offers to suit particular scenarios.

Value associated with the performance of certain offers can be set in a variety of manners. In some embodiments, value of the consumer, value of a particular affiliate's traffic, and other characteristics are utilized to assign a proper value. In some embodiments, ad placement is dynamically priced based on various factors, such as the popularity of the affiliate website, the type of ad being run, and the time at which the ad is run. In some embodiments, these factors may be reflected in a bidding process to determine the true market value of any ad placement. As such, certain affiliates may be assessed a greater value for servicing requests, relative to others. Service requesters may select criteria that facilitates routing of the requests, such as to effect a tradeoff between a higher volume for lower cost, or lower volume at higher performance for the same cost as lower performance at higher volume.

Performance monitoring may be carried out in a variety of manners. For instance, where advertisements are routed for obtaining clicks through by users to an advertiser's web page a performance metrics can be generated for indicating a click through ratio (CTR) as a number of clicks per display, per advertising campaign, per user, or a combination thereof. Earnings per click (EPC) can be assessed as another performance metric, which can be tied specifically to advertisers. A conversion ratio (CVR) relating to a number of conversions (e.g., actual sales) per number of clicks may be the subject of another performance metric. Other events may similarly be used, such as an application installation, a user registration, trial registration, registration renewal, and others. Where advertisements are routed, performance metrics may be assessed for ensuring availability of a service being advertised for user's location, delivery in a proper form factor and/or for a proper operating system, and delivery in a proper language for users being targeted.

Criteria may be assessed and implemented for selecting or matching offers. For instance, different criteria may be assigned different importance or weighting levels, and implemented accordingly. In some instances, where there is little or no statistical variance in a certain criteria for different affiliates, criteria assigned to a next-level of importance may be utilized for selecting affiliates.

In a specific example, a service-requester (via a service-requesting data communications server) specifies to the performance exchange system a required level of advertising to occur over the Internet and as measured by, as one of a set of metrics, a volume of Internet traffic occurring through ads in an advertisement ("ad") campaign. The ad campaign is tracked, based on actual daily clicks and optionally also, dwell-time and conversion data such as chat/purchase-order data as related to such clicks. The actual number of clicks may be tracked and charted (e.g., graphically for GUI-reporting purposes) via a plotted number of clicks each day over a period of days. The charts may also contain other information, such as the number of positive actions resulting from the clicks. This may relate to purchases on the advertiser's website, email subscriptions, or other metrics useful for assessing the efficacy of an ad campaign (sometimes referred to as conversions). Revenue generated by the ad campaign may also be displayed.

A traffic source may refer to a link associated with an online advertisement that when clicked on, causes the customer to be taken to a website of the advertiser. In this context, data traffic routed from an advertiser and provided for access by a user, may generate traffic to the advertiser's web page when such a user clicks on advertising content in the data traffic. For instance, an advertiser may have set up multiple traffic sources (e.g., a clickable advertising image), where each traffic source may be displayed in different affiliate websites. For each traffic source, the example display may also include a daily budget indicating how much money has been allocated to display the traffic source per day, a status of the operation of the traffic source, an estimated cost of the traffic source, an estimated return of the traffic source, and various profit statistics. Multiple traffic sources can be included in any one particular ad campaign. Each ad campaign listed may include additional statistics or other information, such as a daily budget, a present status of the campaign, a number of clicks on the link leading to the advertisers website, and any estimated profit or return from the ad campaign.

In accordance with a particular embodiment, an apparatus includes a quality assessment module and an exchange module, each of which includes circuitry. The quality assessment module is configured to monitor performance characteristics of a plurality of affiliates that distribute data traffic resources, such as advertisements with linking data, over respective communication networks and to assess quality characteristics of the data traffic resource distribution by the plurality of affiliates, based on the monitored performance and stored data characterizing each of the affiliates. Metrics indicative of performance of each of the affiliates are generated based on the assessed quality characteristics. The exchange module interfaces with a plurality of service requesters (e.g., advertisers) for receiving requests for distribution of the data traffic resources, and with the affiliates for receiving offers for distributing data traffic resources over disparate networks respectively associated with each of the affiliates. For data traffic requests received from one of the plurality of service requesters, the exchange module routes data traffic resources pertaining to the requests to at least one of the plurality of affiliates based on the metrics and the offers received from the plurality of affiliates.

Using this approach, affiliates and advertisers may set criteria with the exchange module such that data traffic routing can be carried out according to the criteria, without necessarily having direct contact/criteria (or contracts) with each other. The exchange module may thus route data traffic resources pertaining to the requests to affiliates, based on independent sets of criteria respectively maintained for each of the data sources and for each of the affiliates. For instance, priority characteristics may be assigned to the requests received from the data traffic resources based upon profile data stored for the respective service requesters, the requests, and available affiliates. These priority characteristics may then be used for routing data. In various contexts, this approach addresses challenges including those noted above, in matching affiliates with advertisers, and in efficiently managing and effecting data traffic resource routing. Further, metrics can used to ensure that certain performance levels may be reached, providing quality assurance to advertisers and ensuring the data traffic resource routing is carried out in a proper manner.

The exchange module can be implemented in a variety of manners. In some implementations the exchange module routes data traffic resources by providing network interfacing, data exchange and distribution of data traffic resources across disparate networks in accordance with the requests. Such networks may, for example, be operated by third-party entities and involve pre-associated affiliates and service requesters, with data traffic resources being routed within such networks and externally to such networks. To facilitate such approaches, data specifying affiliates that are pre-associated with the service requesters may be maintained. Data traffic resources can be routed for selected ones of the service requesters to affiliates that are pre-associated with the service requesters, and to affiliates that are not pre-associated with the service requesters, based on criteria specified by the service requesters.

The quality assessment module may be implemented in a variety of manners. For instance, user engagement can be monitored relative to data traffic resources (e.g., advertisements) that are presented. Past performance indicators can be used to score an affiliate's ability to generate website click traffic that is "relevant" and/or to score experience in handling like-type traffic as may relate to the same or similar goods/services, or more generally, size and experience. Further indicators may relate to demographics of a targeted audience and related functionality of particular affiliates (e.g., Spanish speaking, age-specific, specific religious background, or athletes for sports marketing), and how many networks are available via the affiliates.

A likelihood of respective affiliates to be able to serve data traffic requests, or to do so with data traffic routing solutions that are relevant to predefined criteria set by the service requesters from which the data traffic requests originate, may be assessed with related metrics being generated. The quality assessment module may also assess demographic characteristics of data traffic resource routing by the respective affiliates. The exchange module may then select affiliates for routing the data traffic requests based on the metrics, which are based on one or more of user engagement, demographics (e.g., and target demographic characteristics associated with the data traffic requests), and/or assessed likelihood(s).

Consistent with the above, the quality assessment module and exchange module may operate for serving other networks of affiliates and/or advertisers, which may be managed by third party systems with which further interfaces may be made. In one such embodiments, a subset of the plurality of affiliates and a subset of the plurality of service requesters are part of a network system in which the affiliates in the subset route data traffic resources for the service requesters in the subset. The exchange module routes data traffic resources pertaining to the data traffic requests from the service requesters in the subset for overflow data traffic requests exceeding a threshold volume of data traffic served by the affiliates in the subset, to affiliates that are outside of the network. This approach addresses problems such as those noted above, in which network interfacing and related data traffic routing is not otherwise available. In a more particular application, the exchange module accesses a network operation module for the network system, obtains data therefrom specifying data traffic routing criteria. Data traffic resources are routed from or on behalf of the service requesters in the subset according to the routing criteria, and data traffic resources are routed to the affiliates in the subset according to the routing criteria.

In a more particular embodiment, a third party network of affiliates (or predominantly affiliates) is integrated for operation with the exchange module, for serving data traffic resources to the affiliates. This approach allows the network to focus on affiliate integration, without necessarily providing functionality relative to routing of data traffic resources to those affiliates. For instance, a subset of the plurality of affiliates may be part of such a network system in which the affiliates in the subset route data traffic. The exchange module accesses a network operation module for the network system and obtains therefrom data specifying data traffic routing criteria for the affiliates. Data traffic resources pertaining to the data traffic requests from service requesters that are external to that network, are routed to the plurality of affiliates in the subset in accordance with the data traffic routing criteria and metrics utilized by the exchange module.

In a more particular embodiment, a third party network of advertisers (or predominantly advertisers) is integrated for operation with the exchange module, for utilizing data traffic resource routing services. For instance, a subset of the plurality of service requesters may be part of a network system in which the service requesters in the subset provide requests for the distribution of data traffic resources. The exchange module serves the requests using affiliates that are outside of the network. Specifically, a network operation module is accessed for the network system, and data specifying data traffic resource routing criteria for the service requesters is obtained therefrom. The requests are routed from the service requesters in the subset to the plurality of affiliates, in accordance with the data traffic routing criteria.

Another embodiment is directed to a method (e.g., as may also be implemented as instructions stored on a non-transitory computer readable medium), as follows. Performance characteristics are monitored for a plurality of affiliates (e.g., publishers) that distribute data traffic resources, such as advertisements, over respective communication networks. Quality characteristics of the data traffic distribution are assessed for the plurality of affiliates based on the monitored performance and stored data characterizing each of the affiliates. Metrics in indicative of performance of each of the affiliates are generated based on the assessed quality characteristics. Interfaces are made with the service requesters (e.g., advertisers) for receiving requests/offers for distribution of the data traffic resources, and further with the plurality of affiliates for receiving offers for distributing data traffic resources (and, e.g., obtaining related data traffic) over disparate networks respectively associated with each of the affiliates. For data traffic requests received from one of the plurality of service requesters, data traffic resources pertaining to the requests are routed to one or more of the affiliates based on the metrics and the offers received from the plurality of affiliates.

The data traffic resources may be routed from data sources to affiliates based on independent sets of criteria respectively maintained for each of the data sources and for each of the affiliates. For instance, metrics and/or profile data associated with disparate affiliates may be utilized with criteria specified by the data sources to select affiliates for routing. As an example, certain affiliates may be associated with particular demographics as specified via metrics. When data sources wish to target various demographics, this information can be used in selecting different affiliates with varied demographics. Other information, such as performance and cost, may be similarly used. For instance, tradeoffs between performance and cost may be specified in profile information associated with data sources, and used to select affiliates for routing date traffic resources.

Consistent with the above, the data traffic resources may include data for displaying advertising images with linking data that links the advertising images to network-based content, and which conveys the network-based content to users that engage the linking data via the advertising images. Monitoring performance characteristics in this context may include monitoring engagement of users with the network-based content.

Assessed quality characteristics and related metrics may involve a variety of approaches, to suit particular applications. For instance, user engagement can be monitored and metrics can be generated to characterize the engagement. A likelihood of respective affiliates to be able to serve data traffic requests may be monitored and used in generating metrics. Similarly, a likelihood may be assessed for the ability of respective affiliates to serve data traffic requests with data traffic routing solutions that are relevant to pre-defined criteria set by the service requesters from which the data traffic requests originate, with related metrics being generated.

Turning now to the figures, FIG. 1A is a system-level diagram illustrating an example system and related approach for data routing, in accordance with the present disclosure. A performance exchange 10 operates in a variety of manners, to suit particular embodiments. For instance, the performance exchange 10 may serve one or more networks such as networks 20 and 30, as well as individual entities such as affiliate 40 and service requestor 50. The performance exchange 10 may facilitate the matching of data traffic resources from service requestors with affiliates capable of serving requests for routing of the data traffic resources for interaction with end users. The affiliates may work to present advertisements to users in one or more of a variety of manners, such as via web pages, social media, applications running on a mobile device (e.g., phone) or computer, or email.

Network 20 includes service requestors 21 and a network manager 22, which may utilize contracts 23 and profiles 24 involving the service requestors. In some implementations, network 20 also includes affiliates 25. Network 30 includes affiliates 31 and a network manager 32, which may utilize contracts 33 and profiles 34. Network 30 may also include service requestors 35. Accordingly, network 20 may be exclusively of service requestors, and network 30 may be exclusively of affiliates. Alternately, one or both of networks 20 and 30 may involve both affiliates and service requestors.

Profiles 24 and 34 may include data correlated to the service requestors or affiliates, respectively, including identification data for the entity for which data resources and resulting data traffic is routed. Profiles may specify certain performance characteristics for the service requestors, as may identify a quantity and/or type of traffic desired or requested, demographics of desired interactions, or a type of advertisement. Affiliate profiles may set forth similar information with regard to affiliates' ability and/or desire to perform in accordance with certain characteristics. The profiles may also include trade-channel/business information such as may be indicative of company size, type of vertical suppliers (e.g., in a particular technological and/or transaction field), and offerings (e.g., goods/services). The profiles 24 may include types of desired and/or acceptable types of traffic, such as that which may stem from social media, website advertising, web search results, and direct advertising as may be implemented via email.

In various contexts, the performance exchange 10 engages independently for setting up the affiliates 40 and service requestors 50 for operating on the performance exchange. This may approach may involve, for example, working with individual service requestors and affiliates, with networks of subgroups of the service requestors and/or affiliates, or a combination thereof. Certain criteria may be utilized to evaluate distribution offers received from affiliates, and may include information characterizing a type and volume of data traffic requests that the affiliates are willing to receive.

The performance exchange 10 may include a variety of components. For instance, the performance exchange 10 may include a quality assessment module 11 that operates to assess quality characteristics of data routing and related traffic. For instance, performance aspects of the affiliates who serve requests may be monitored. In some implementations, the performance exchange 10 includes an exchange control module 12, such as circuitry that facilitates setup and/or performance of data traffic routing. A data storage circuit/memory 13 may be utilized to store data for one of more of routing data, quality assessment and exchange control.

The system shown in FIG. 1A may be configured for one or more of: setting up service requesters (e.g., advertisers) for operation on the performance exchange 10, setting up affiliates for operation on the performance exchange, performing/monitoring exchanges for service requesters, and performing/monitoring exchanges for affiliates. For instance, the system may set up network 20 of service requesters 21 with the exchange control module 12 operating as a router and exchange module. The router interfaces with affiliates (e.g., in network 30 or at 40) for establishing data traffic resource routing criteria including information for selecting data traffic resources to be routed and served by the affiliates for providing data traffic over disparate networks. The exchange module sets up distribution of the data traffic resources for obtaining the data traffic based on requests from service requesters. A routing option is selected for each received request based on routing criteria for the affiliates and criteria associated with the service requester from which the request is received (e.g., profiles).

The system in FIG. 1A may operate to set up advertisers for obtaining traffic, with the exchange control module 12 operating as (or including) a router and exchange module. The router interfaces with service requesters (e.g., advertisers) for establishing criteria for routing data traffic resources, including information for selecting and implementing routing options for the service requesters. The exchange module sets up distribution of the data traffic resources for obtaining data traffic based on requests from the service requesters. A routing option may be selected for each of the received requests based on the routing criteria for the service requester from which the request is received and based on criteria associated with disparate affiliates that distribute data traffic resources over disparate networks.

When monitoring/performing on behalf of affiliates, the exchange 10 may monitor routing quality and effect routing. For instance, quality assessment module 11 may monitor performance characteristics of data traffic resource distribution by affiliates over respective communication networks, assess quality characteristics of the distribution, and generate metrics indicative of performance of each of the affiliates based on the assessed quality characteristics. Routing may be effected by interfacing with affiliates for establishing data traffic resource routing criteria, which includes information for selecting data traffic resources to be routed and served by the affiliates for providing data traffic over disparate networks. The exchange control module 12 may route data traffic resources provided by (or on behalf of) respective service requestors to one or more affiliates based on data corresponding to the service requesters, the routing criteria, and metrics for the plurality of affiliates.

When monitoring/performing on behalf of service requesters, the exchange 10 may utilize quality assessment module 11 to monitor performance characteristics of data traffic resource distribution by affiliates, assess quality characteristics of the data traffic resource distribution and related data traffic responses based on the monitoring, and generate metrics indicative of performance of each of the affiliates based on the assessed quality characteristics. Routing may be effected by interfacing with service requesters for establishing routing criteria including information for selecting data traffic resources to be routed and served by affiliates. The exchange control module 12 may route data traffic resources to affiliates based on data corresponding to the service requesters, the routing criteria, and the metrics for the plurality of affiliates.

Figure 1B:
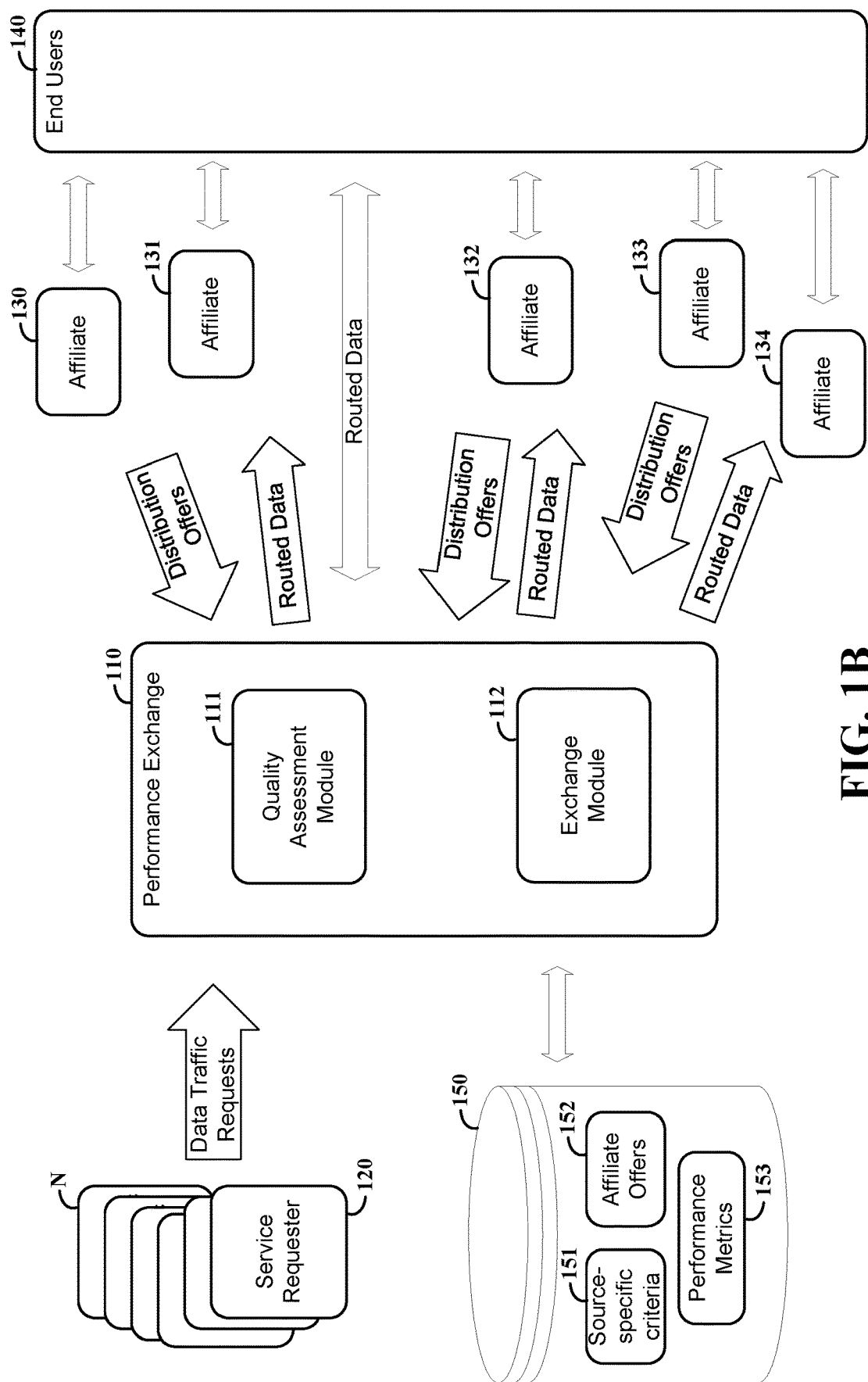
FIG. 1B is another system-level diagram illustrating an example system and related approach for data routing, in accordance with the present disclosure.

FIG. 1B is another system-level diagram illustrating an example system and related approach for data routing, in accordance with the present disclosure. A performance exchange 110 includes a quality assessment module 111 and an exchange module 112, and provides a network-type interface between a plurality of service requesters 120-N and a plurality of affiliates (130-134 shown by way of example). The performance exchange 110 may include one or more logic circuits that implement the quality assessment module 111 and exchange module 112, the latter of which assesses data traffic requests received from the service requesters 120-N and routes the requests to respective affiliates for providing to end users.

The performance exchange system may further interact with memory circuitry at 150, for storing data including one or more of source-specific criteria 151, affiliate offers 152, and performance metrics 153. Using this information, the system may select certain of the qualified affiliates to (co-)perform on the requested services. To increase the selectivity to be used by the system, the source-specific criteria may include information associated with respective ones of the service requesters 120-N and/or of the affiliates 130-134, as may relate to criteria upon which individual data traffic requests are routed for requested performance. In an example case where the requested service is set forth via a service requester from a particular service-requesting server (e.g., requesting a volume of contacts for selling a certain type of widget or a volume of contacts promoting a certain public policy or official), the service-requesting server can provide data with bias factors used to weight for and/or against certain affiliates which would score poorly on a filtering algorithm used by the system to set up relationship through which selected affiliates would provide such performance measured by the performance exchange system. To this end, the filtering algorithm can be configured to invite and select from a limited set of affiliate offers 152 based on characteristics stored in the system database 150 associated with the affiliates. The types of performance metrics 153 to be used by the algorithm are thereby set up as a function of such factors (or criteria) whether provided by the service-requesting server as being important factors or biasing default factors known to be used by the exchange system ("default affiliate-selection factors"), and any other specific weighting criteria such as emphasizing certain factors as more important than others by adding/subtracting the factor with a numeric bias score. These factors are accounted for by the algorithm for the scoring in connection with the performance metrics. One or more of a variety of such algorithms for generating the performance metrics may be based on one or more customized or pre-configured factors for selecting the affiliates to be invited, selected for initial performance and/or maintained as affiliates toward completion of performance for the requested service. Such factors (not limited to the default affiliate-selection factors) may include as examples: scored quality of each selected affiliate being greater than a threshold, known volumes shown to be adequately performed by each selected affiliate, and history of each selected affiliate with regards to duration/quantity of experience working with the system and/or with performance in connection with the (same) service-requester.

Consistent with the above, the service requesters 120-N may be referred to as service requestors as otherwise utilized herein, which request traffic. Resources such as web links and advertising data may be provided for routing to end users 140, by one or more of the affiliates 130-134 or directly from the performance exchange 110. Data traffic results when end users engage with the resources, such as by visiting a website associated with a service requesters. Affiliates may interact with another layer of entities that engage with the end users 140 to provide user traffic, such as a social media provider or search engine provider, and may buy (e.g., pay for) a certain volume of user data traffic obtained via user clicks on links or other information that directs such users to data service requesters.

The performance exchange 110 may operate in a variety of manners, to facilitate the matching of service requesters, with affiliates 130-134 capable of serving requests for routing of the data traffic resources for interaction with end users 140. For instance, when used in the context of service requests made by advertisers wanting advertising resources to be routed for generating engagements with end users, the affiliates 130-134 operate to facilitate such engagement. For instance, the affiliates may work to present the advertisements to the users in one or more of a variety of manners, such as via web pages, social media, applications running on a mobile device (e.g., phone) or computer, or email. The quality assessment module may monitor various aspects of the affiliates who serve the requests, which may involve one or more of: monitoring characteristics of the medium(s) via which the data traffic resources are provided, monitoring interactions with users, monitoring characteristics of the users with which interactions are made, and monitoring characteristics of engagements with the users made via the data traffic resources.

In various contexts, the performance exchange 110 engages independently for setting up the service requesters 120-N and affiliates 130-134 for operating on the performance exchange. This may approach may involve, for example, working with individual service requesters and affiliates, with networks of subgroups of the service requesters and/or affiliates, or a combination thereof. Such setup may involve setting and storing source-specific criteria 151 pertaining to individual service requesters, affiliates, or networks. Such criteria may include information upon which data traffic routing may be effected. For instance, with regard to the service requesters, such criteria may include performance or valuation criteria that can be used to evaluate distribution offers received from affiliates for engagement with the affiliates. With regard to affiliates, such criteria may include information characterizing a type and volume of data traffic requests that the affiliates are willing to receive. Accordingly, the exchange module 112 may evaluate such criteria in connection with data traffic requests, distribution offers, and related performance metrics 153.

In some implementations, the performance exchange 110 of FIG. 1B and its related functionality is implemented for performance exchange 10 in FIG. 1A. For instance, affiliates 130-134 may be part of network 30 and/or independent (e.g., affiliate 40). The service requester 120 may be part of network 20 and/or independent (e.g., service requester 50). As such, the performance exchange in FIG. 1A may be implemented in connection with one or more aspects of the above discussion of FIG. 1B.

Figure 2:
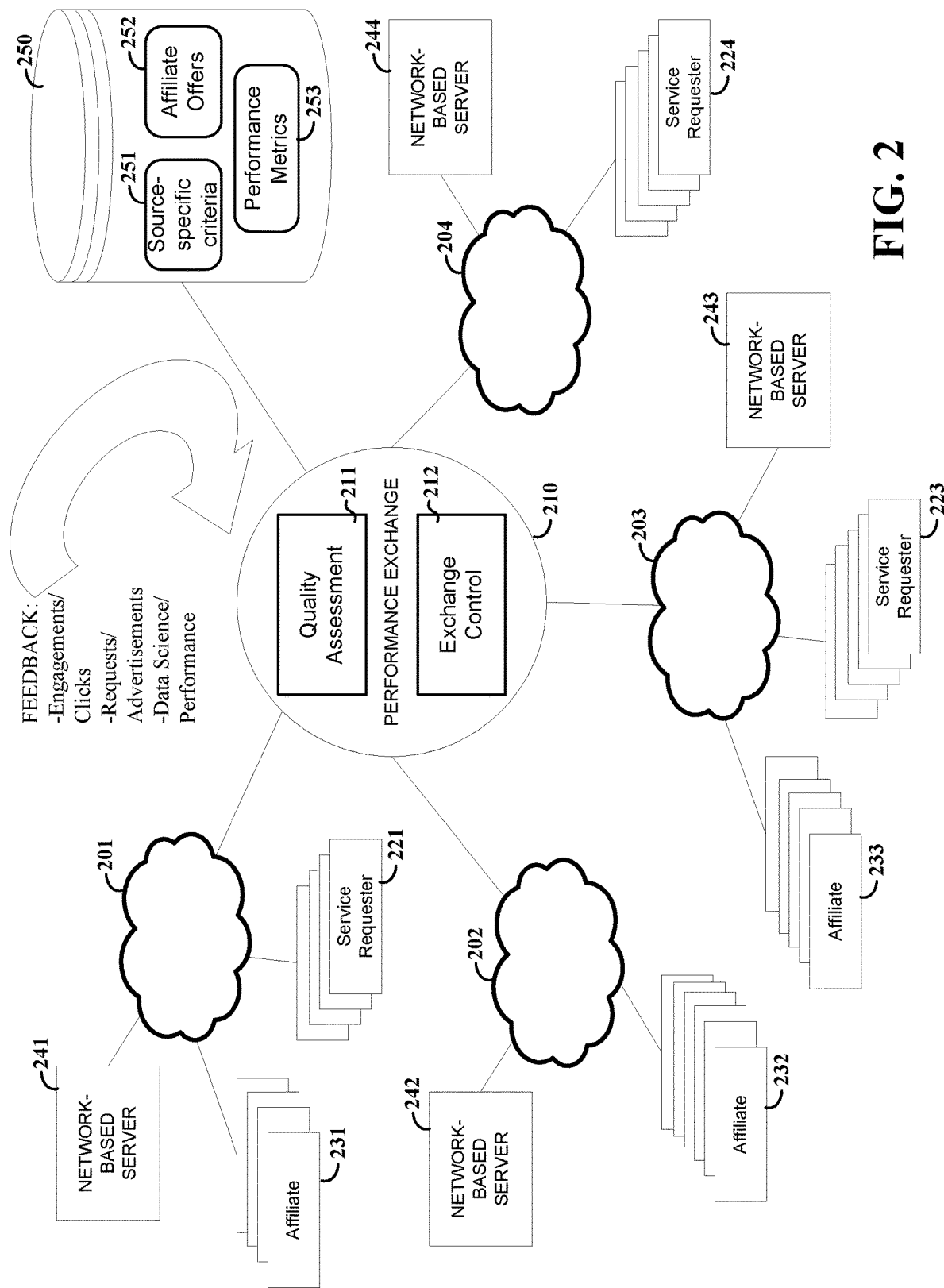
FIG. 2 is another system-level diagram illustrating an example system and related approach for data routing involving interaction with disparate networks, in accordance with the present disclosure.

FIG. 2 is another system-level diagram illustrating an example apparatus and related approach for data routing involving interaction with disparate networks, in accordance with the present disclosure. A performance exchange 210 includes a quality assessment module 211 and an exchange control module 212, which may operate in manner similar to that characterized above with the performance exchange 110, utilizing memory circuitry 250 for storing and accessing source-specific criteria 251, affiliate offers 252 and performance metrics 253. The quality assessment module 211 receives and uses feedback from one or more aspects of the system to assess quality of performance by networks, affiliates and/or service requesters. Such quality may relate to engagements or clicks, request characteristics, advertisement characteristics, data science and performance functions.

A plurality of disparate networks 201-204 with servers 241-244 respectively interface with the performance exchange 210, for providing requests and/or routing such requests to affiliates, in accordance with an assessed quality and performance associated with the networks and/or affiliates. Networks 201 and 203 include both service requesters 221/223 and affiliates 231/233, which respectively provide and serve service requests. Network 202 is an affiliate network with affiliates 232, and network 204 is a service requester network with service requesters 224. In this context, while networks 201 and 203 may provide both service requests and performance offers to the performance exchange 210, network 202 is tailored for providing performance offers (and for receiving routed requests for related performance), and network 204 is tailored for providing service requests (and for sending service requests to the performance exchange 210).

Referring to network 201 by way of example, the network-based server 241 may function to facilitate interactions between service requesters 221 and affiliates 231 that are part of the network 201, for routing and performing on service requests within the network. When the network 201 has excess service requests, for example when the affiliates 231 as part of the network cannot handle necessary bandwidth for such requests or may fail to meet needs of certain requests, the network 201 may route such requests to the performance exchange for effecting performance thereof. Similarly, when the network 201 has bandwidth to handle external service requests in addition to those within the network, or when such external service requests may be desirable for serving (e.g., financially or otherwise), the network 201 may interact with the performance exchange for receiving routed service requests and providing the service requests to one or more affiliates 231 for performance thereof. Consistent with the above, the performance exchange 210 may assess quality of the network 201 of affiliates 231 or of individual affiliates to which service requests are routed, and route the requests accordingly.

Referring to network 202, this affiliate-based network may not route service requests internally, but instead interface with the performance exchange 210 for providing service offers on behalf of the affiliates and for receiving routed service requests from service requestors of one of networks 201, 203 and 204. In some embodiments, offers received from network 202 may be generated by network server 242 and be made on behalf of all affiliates 232 therein. In such embodiments, the quality assessment module 211 may assess the quality of individual ones of the affiliates 232 and/or of the network 202 for matching service requests with the affiliates. In some implementations, the exchange control module 212 may match and route service requests to the network 202, which in turn matches and routes the service requests to individual ones of the affiliates 232. Matching criteria as well as performance metrics associated with the entire network 202 may be used in this regard. In other implementations, the exchange control module 212 selects individual ones of the affiliates 232 for routing service requests thereto, and routes the service requests accordingly (e.g., directly to the selected affiliate and/or via network 202 with the selected affiliate being identified). As such, matching criteria and performance metrics for individual affiliates may be used for such individual affiliate selection and routing.

Referring to network 204, this service requester-based network may not effect performance on any service requests, and instead interface with the performance exchange 210 for sending service requests for performance by affiliates in one or more of networks 201-203. In some implementations, the network 204 routes service requests on behalf of multiple ones of the service requesters 224, using criteria 251 and related performance metrics 253 that are applied to the entire group of service requests. In other implementations, the network 204 routes service requests for individual service requesters, using criteria 251 and performance metrics 253 specific to the individual service requester needs. The performance exchange 210 operates accordingly, based on whichever criteria 251 and performance metrics 253 are set and used for the transaction.

In some embodiments, one of more of the networks 201, 202 and 205 may import affiliate offers from the performance exchange 210, and select affiliates for routing service requests in accordance with the offers. In this context, the performance exchange 210 may function to provide performance metrics 253 to the network making a direct offer selection.

In other embodiments, one of networks 201, 202 and 204 may import mixes of offers from respective affiliates to be imported. Such a mix may be imported as a "virtual" offer that pertains to performance by a group of affiliates. For instance, a mix of auto insurance offers may be imported as one virtual "auto insurance offer" that redirects to multiple separate auto insurance offers, based on availability and performance.

Figure 3:
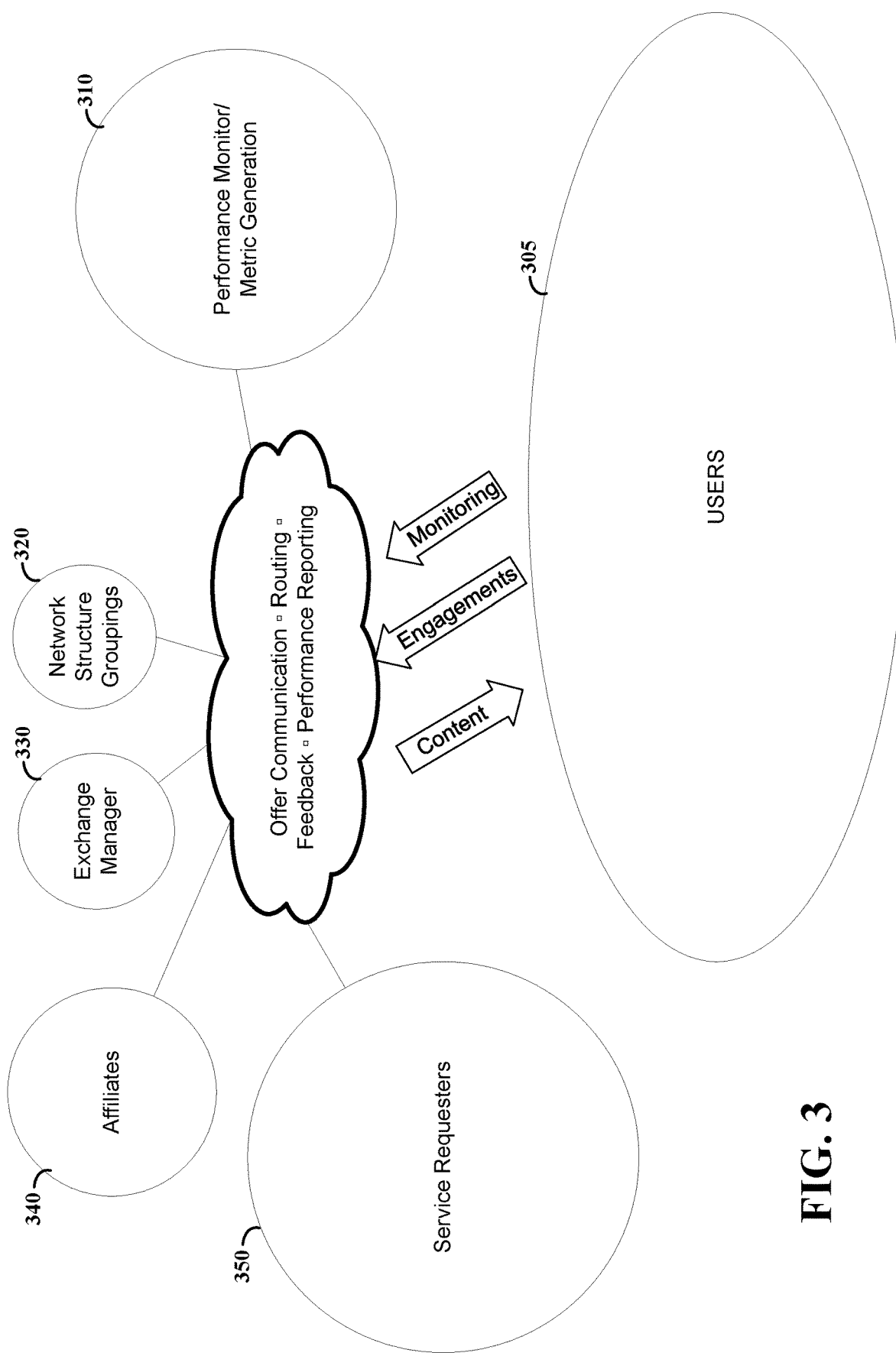
FIG. 3 is a system-level diagram illustrating an example system and related approach for performance monitoring with routing, in accordance with the present disclosure.

Consistent with aspects of the above-discussed examples, FIG. 3 is a system-level diagram illustrating another computer-implemented example system and approach for performance monitoring with routing, in accordance with the present disclosure. As noted above, performance exchange functions as characterized herein may utilize a variety of performance monitoring and metric generation approaches, to assess quality of the performance on services involving users 305 for a variety of applications. A performance monitor/metric generation module 310 operates to monitor and assess performance for content provided to the users 305, along with related engagements by the users and other user-related monitoring. The content is provided for facilitating engagements by affiliates 340, on behalf of service requesters 350, as managed by an exchange manager that interfaces with the affiliates and service requesters for offer communication and routing. Such approaches may be implemented in a manner similar to that characterized with FIGS. 1 and 2 above.

In various implementations, the system and approach depicted in FIG. 3 utilizes network structure groupings 320, which may specify groupings of affiliates, service requesters, or both. Such groupings may include multiple groupings of certain entities, such as affiliates that may belong to two or more different groupings, respectively for performing service requests. Further, as each grouping may be assigned different metrics and performance-related criteria, participating in different groupings may facilitate involvement in a variety of differently-targeted network service and routing solutions, as may be tailored for certain applications.

The following embodiments and implementations may be utilized in connection with the system/approach shown in FIG. 3, or in aspects characterized otherwise herein and/or depicted in the other figures. Offers for servicing data traffic may be established, received and implemented in a variety of manners. In some embodiments, data corresponding to offers can be established for entities such as advertisers proving data traffic for routing, and those offers (from particular affiliates) may be synchronized for changes in the offers as made by the affiliates. Such changes may, for example, pertain to volume, type, budget, traffic targets, and more. Establishing offers for the entities may be carried out by, for example, storing data linking offers for an advertiser identification, and may involve automatically selecting offers based on advertiser criteria and characterization of the offers. Offers may further be grouped and selected based on grouping, such as within a vertical arrangement.

When offers change (e.g., as may be ascertained via scanning), the offers can be updated for the advertisers. For example, when changes in offers affect offer selection as set by criteria used for certain advertisers, offers may be added or removed for those advertisers. In this context, offer association with advertisers can be dynamically modified to suit criteria, and in view of performance-based metric that may change over time. For instance, if affiliate performance drops, offers from that affiliate may be assessed a lower rating and be removed from advertisers based on rating metrics. As another example, if an affiliate's pricing structure lowers, offers from that affiliate may be added to advertisers having criteria specifying lower pricing.

Offers are established and managed on behalf of affiliates in a variety of manners. In some instances, a plurality of offers are established for one or more affiliates, with a subgroup of the offers specified as available for presentation on an exchange system, while other ones of the offers may be held back for utilization on a separate network. For instance, referring to FIG. 2, the affiliates at 231 may establish certain offers that may be utilized by service requesters 221 within network 201, and that may also be presented on the performance exchange 210 for utilization by other service requesters operating on the exchange (e.g., service requesters 223 and 224). Other offers may be established by the affiliates at 231 that are held within the network 201. The performance exchange 210 may similarly monitor or scan affiliate systems for updates to offers, and re-characterize offers accordingly.

Traffic flow through a performance exchange as characterized herein may be managed in a variety of manners. In some instances, one-to-one traffic is managed by adding specific offers in a system to a particular advertiser. This may be implemented by direct selection without implementing an algorithm-based approach for selecting and identifying offers. This may, for example, involve directing traffic outside of an exchange, directly between advertisers (or an advertiser network) and affiliates (or an affiliate network). In other instances, a one to multi-entity approach is carried out, as may be implemented with groups or mixes of offers to be imported. For example, a mix of auto insurance offers may be selected and imported as a virtual "Auto Insurance Offer" that actually redirects to multiple separate auto insurance offers. This redirection may be based on availability and performance.

Affiliates, groups of affiliates and/or networks may be rated in a variety of manners. In some implementations, quality can be determined based on one or more of the following criteria: data indicating blocking of an affiliate on other campaigns, which may be in a common vertical (e.g., field/type served by advertisers); affiliate payout history (e.g., as may be indicative of desirability of affiliate-provided traffic); reversals associated with the affiliate (e.g., conversions for which a refund or cancellation is provided), and fraud score (e.g., falsely-indicated traffic); and advertiser-based criteria involving one or more of clicks, installs, purchases and cancelations.

Volume attributable to affiliates can be determined based on one or more of a variety of factors. For instance, affiliate volume on other campaigns in the same vertical can be compared to average volume associated with other affiliates on a specific offer. For example, if one million clicks per month are being served by 10 affiliates, the average is 100,000 clicks per affiliate. If a particular affiliate alone is doing 200,000 clicks on other campaigns in the same verticals, then a potential may be associated with that affiliate as noting 200,000 clicks could be transferred to the offer, in view of which the volume rating of the affiliate can be set high.

In a particular implementation, affiliates are rated as follows, with a percentage of affiliates for each rating and an overall rating, such that 1 star is assigned to 2% of affiliates, 2 stars to 3% of affiliates, 3 stars to 5% of affiliates, 4 stars to 40% of affiliates, and 5 stars to 50% of affiliates. This could be assessed such that 50% of revenue is coming from 5 star affiliates, 20% of revenue is coming from 4 star affiliates, 15% of revenue is coming from 3 star affiliates, 10% of revenue is coming from 2 star affiliates and 5% of revenue is coming from 1 star affiliates. An overall network rating could be denoted as 86% where $1\times2+2\times3+3\times5+4*40+5*50=433$ points out of max 500 points=433/500*100=86%.

Campaign rating can be carried out in a variety of manners. For instance, popularity may be attributed to a number of affiliates sending traffic to the campaign plus a number of affiliates asking permissions to run traffic on it, as may include both rejected and accepted ones Traffic volume (amount of clicks a campaign receives compared to other campaigns in the vertical) may also be utilized.

Figure 4:
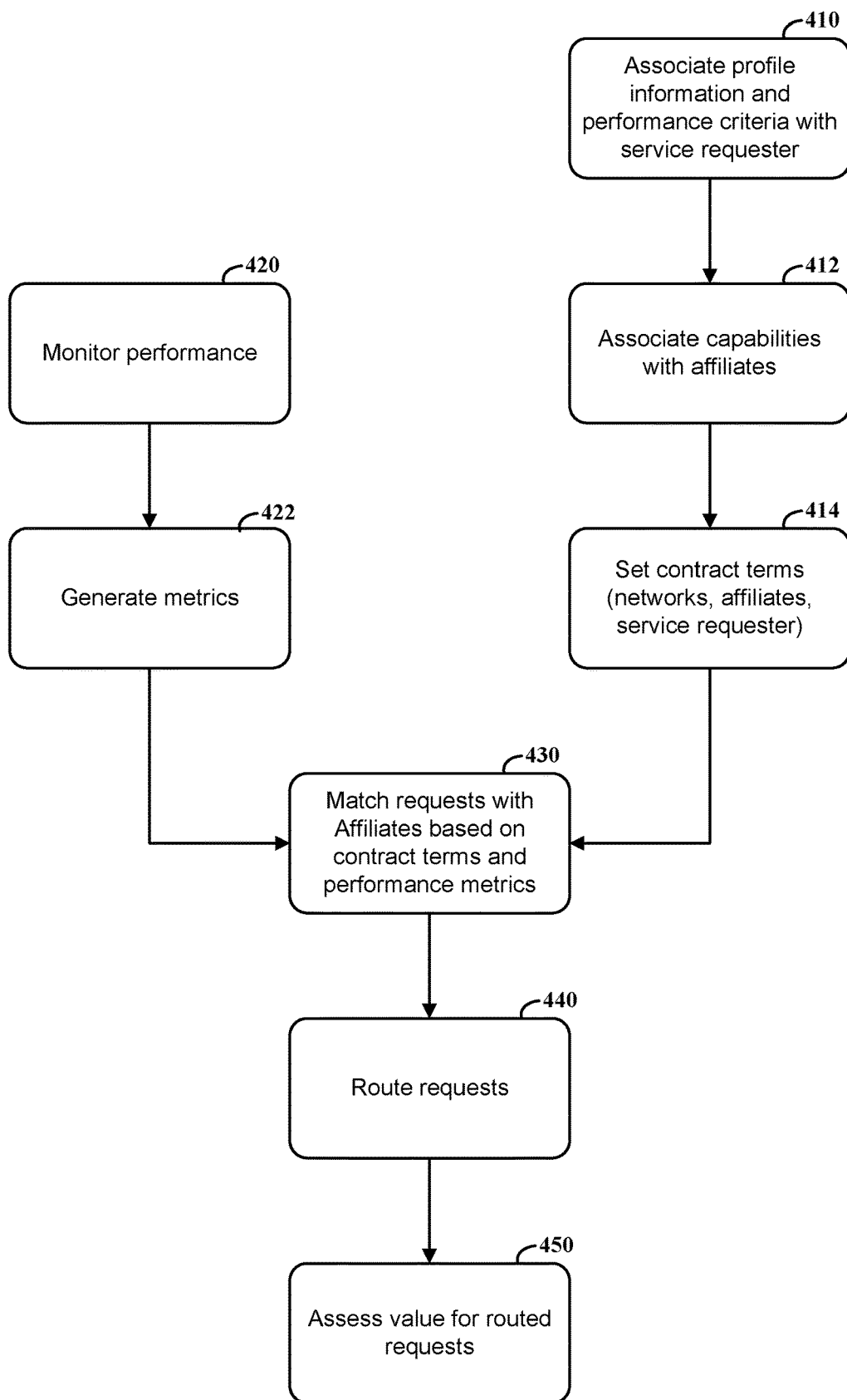
FIG. 4 is a data flow diagram illustrating an exemplary set of activities and/or data flow, in accordance with the present disclosure.

FIG. 4 is a data flow diagram illustrating an exemplary set of activities and/or data flow, in accordance with the present disclosure. At block 410, profile information and performance criteria are associated with a service requester. Such criteria may, for example, relate to desired performance characteristics and related tolerances, which may be utilized for matching service requests with offers. At block 412, capabilities are associated with affiliates that provide offers for servicing requests, and may also involve setting profile information for the affiliates. Contract terms are set at block 414, involving one or more of networks, affiliates and service requesters, which may be used for carrying out performance exchange functions.

For affiliates that are already associated as in block 412, performance is monitored at block 420 and related metrics are generated at block 422. At block 430, service requests are matched with affiliates based on contract terms and performance metrics for the affiliates. The requests are routed for performance at block 440, the performance of which may further be monitored at block 420. A value for the routed requests may be assessed at block 450, with a portion of the value be attributed to the matching effected via performance exchange.

The skilled artisan would recognize that various terminology as used in the Specification (including claims) connote a plain meaning in the art unless otherwise indicated. As examples, the Specification describes and/or illustrates aspects useful for implementing the claimed disclosure by way of various structure, such as circuits or circuitry selected or designed to carry out specific acts or functions, as may be recognized in the figures or the related discussion as depicted by or using terms such as blocks, modules, source, affiliate, exchange, device, system, unit, controller, and/or other examples. See, e.g., reference numerals 110, 111, 112, 120, and 130 of FIG. 1B. It will also be appreciated that certain of these components may also be used in combination to exemplify how operational aspects (e.g., steps, functions, activities, etc.) have been designed, arranged. Whether alone or in combination with other such blocks (or circuitry including discrete circuit elements such as transistors, resistors etc.), these above-characterized blocks may be circuits configured/coded by fixed design and/or by (re)configurable circuitry (e.g., CPUs/logic arrays/controllers) and/or circuit elements to this end of the corresponding structure carrying out such operational aspects. In certain embodiments, such a programmable circuit refers to or includes one or more computer circuits, including memory circuitry for storing and accessing a set of program code to be accessed/executed as instructions and/or (re)configuration data to perform the related operation, as may be needed in the form of carrying out a single step or a more complex multi-step algorithm. Depending on the data-processing application, such instructions (and/or configuration data) can be configured for implementation in logic circuitry, with the instructions (via fixed circuitry, limited group of configuration code, or instructions characterized by way of object code, firmware and/or software) as may be stored in and accessible from a memory (circuit).

As another example, where the specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure designed or coded to perform or carry out the operation associated with the structure (e.g., "first circuit to convert . . . " is interpreted as "circuit to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, a variety of types of service requests across a multitude of service industries may be routed over disparate networks, with performance monitoring and a related exchange functioning to match the service requests with affiliates or other entities facilitating the performance of the requests. As another example, fewer or additional layers of intervening networks may be implemented, with related quality assessment and performance exchange processing carried out via the additional network layers. For instance, a quality assessment may be made for an entire network, encompassing affiliates within that network and used to assess routing of data traffic requests to the network (e.g., without directly assessing quality of each affiliate). Such modifications do not depart from the true spirit and scope of various aspects of the disclosure, including aspects set forth in the claims.

What is claimed is:

1. An apparatus comprising:
   a router configured to interface with a plurality of affiliates for establishing data traffic resource routing criteria for each of the respective affiliates, the routing criteria including information for selecting data traffic resources to be routed and served by the affiliates for providing data traffic over disparate networks, a subset of the plurality of affiliates and a subset of service requesters being part of a network system in which the affiliates in the subset of the plurality of affiliates route data traffic resources for the service requesters in the subset of service requesters;
   a quality assessment module, including circuitry, to assess affiliate capabilities including a likelihood of the respective affiliates' ability to serve data traffic requests, by gathering and using historical data indicative of volume performance of the affiliates; and
   an exchange module, including circuitry, configured to
      receive requests, from the service requesters, for distribution of the data traffic resources for obtaining the data traffic; and
      select a routing option for each of the received requests based on the assessed affiliate capabilities, based on the routing criteria for the plurality of affiliates and based on criteria associated with the service requester from which the request is received, the routing option specifying at least one of the affiliates via which the data traffic resources are to be routed, and to select the routing option for requests from the subset of service requesters for overflow data traffic requests exceeding a threshold volume of data traffic for the subset of the plurality of affiliates, as served by the affiliates in the subset.

2. The apparatus of claim 1, wherein:
   the exchange module includes a filter circuit configured to filter the requests based on the information in the requests and the data traffic resource routing criteria for the plurality of affiliates, and to output information identifying at least one affiliate for serving each request based on the filtering; and
   the exchange module is configured to select the at least one of the affiliates specified in the routing option from the identified at least one affiliate.

3. The apparatus of claim 1, wherein the exchange module is configured to select the routing option based on metrics characterizing performance of the affiliates and offers received from the affiliates, the offers specifying criteria by which the routing option will be performed.

4. The apparatus of claim 1, wherein the exchange module is further configured to route the received requests based on the selected routing option.

5. The apparatus of claim 1, wherein the quality assessment module is configured to:
   monitor performance characteristics of the affiliates and routing options associated with the affiliates;
   assess quality characteristics of data traffic resource distribution by the affiliates based on the monitored performance and stored data characterizing each of the affiliates; and
   generate metrics indicative of performance of each of the affiliates based on the assessed quality characteristics, wherein the criteria associated with the affiliates includes the metrics.

6. The apparatus of claim 1, wherein the exchange module is configured to select a routing option pertaining to the requests based on independent sets of criteria respectively maintained for each of the service requesters and for each of the affiliates.

7. The apparatus of claim 1, wherein the data traffic resources include data for displaying advertising images with linking data that links the advertising images to network-based content and that conveys the network-based content to users that engage the linking data via the advertising images for generating data traffic.

8. The apparatus of claim 1, wherein the exchange module maintains data specifying affiliates that are pre-associated with the service requesters, and selects a routing option for selected ones of the data traffic resources to affiliates that are pre-associated with the service requesters and to affiliates that are not pre-associated with the service requesters, based on criteria specified by the service requesters.

9. The apparatus of claim 1, wherein the exchange module is configured to assign priority characteristics to the requests received from the service requesters based upon profile data stored for the respective service requesters, the requests, and available affiliates.

10. The apparatus of claim 1, wherein the exchange module is configured to select the routing option based on an assessed likelihood of at least two of the plurality of affiliates to be able to serve data traffic requests.

11. The apparatus of claim 1, wherein the exchange module is configured to select the routing option based on assessed demographic characteristics and target demographic characteristics associated with the requests.

12. The apparatus of claim 1, wherein the exchange module is configured to select the routing option for requests from the service requesters in the subset for the overflow data traffic requests exceeding the threshold volume of data traffic served by the affiliates in the subset, by:
   determining the volume being served by the affiliates in the subset based on the assessed affiliate capabilities; and
   comparing that volume to historical data indicative of volume performance of the affiliates in the subset.

13. The apparatus of claim 1, wherein a subset of the plurality of affiliates are part of a network system in which the affiliates in the subset route data traffic resources, wherein the exchange module is configured and arranged to:
   access a network operation module for the network system and obtain therefrom data specifying data traffic resource routing criteria for the affiliates; and
   select the routing option for the requests, for routing on behalf of the service requesters to the plurality of affiliates in the subset, in accordance with the data traffic resource routing criteria.

14. The apparatus of claim 1, wherein a subset of the service requesters are part of a network system in which the service requesters in the subset provide requests for the distribution of data traffic resources, wherein the exchange module is configured and arranged to:

access a network operation module for the network system and obtain therefrom data specifying data traffic resource routing criteria for the service requesters; and select the routing option for the requests, for routing on behalf of the service requesters in the subset to the plurality of affiliates in accordance with the data traffic routing criteria.

15. A method comprising:

interfacing with a plurality of affiliates for establishing data traffic resource routing criteria for each of the respective affiliates, the routing criteria including information for selecting data traffic resources to be routed and served by the affiliates for providing data traffic over disparate networks, a subset of the plurality of affiliates and a subset of service requesters being part of a network system in which the affiliates in the subset of the plurality of affiliates route data traffic resources for the service requesters in the subset of service requesters;

assessing affiliate capabilities including a likelihood of the respective affiliates' ability to serve data traffic requests, by gathering and using historical data indicative of volume performance of the affiliates;

receiving requests, from the service requesters, for distribution of the data traffic resources for obtaining the data traffic; and selecting a routing option for each of the received requests based on the assessed affiliate capabilities, based on the routing criteria for the plurality of affiliates and based on criteria associated with the service requester from which the request is received, the routing option specifying at least one of the affiliates via which the data traffic resources are to be routed, and selecting the routing option for requests from the subset of service requesters for overflow data traffic requests exceeding a threshold volume of data traffic for the subset of the plurality of affiliates, as served by the affiliates in the subset.

16. The method of claim 15, further including filtering the requests based on the information in the requests and the data traffic resource routing criteria for the plurality of affiliates, and outputting information identifying at least one affiliate for serving each request based on the filtering, wherein the at least one of the affiliates specified in the routing option is selected from the identified at least one affiliate.

17. The method of claim 15, wherein selecting the routing option includes using metrics characterizing performance of the affiliates and offers received from the affiliates, the offers specifying criteria by which the routing option will be performed.

18. The method of claim 15, further including routing the received requests based on the selected routing option.

19. The method of claim 15, further including assessing quality by:

monitoring performance characteristics of the affiliates and routing options associated with the affiliates;

assessing quality characteristics of data traffic resource distribution by the affiliates based on the monitored performance and stored data characterizing each of the affiliates; and generating metrics indicative of performance of each of the affiliates based on the assessed quality characteristics, wherein the criteria associated with the affiliates includes the metrics.

20. The method of claim 15, wherein selecting the routing option for the overflow data traffic requests includes, for ones of the service requesters pre-associated with ones of the affiliates, selecting a routing option for routing data traffic to affiliates that are not pre-associated with the service requesters in response to a data traffic overflow condition with the pre-associated ones of the affiliates, the pre-associated ones of the affiliates including the subset of the plurality of affiliates.

* * * * *